(12) United States Patent
Tan et al.

(10) Patent No.: US 6,437,059 B1
(45) Date of Patent: Aug. 20, 2002

(54) COMPOSITION OF EPOXY, URETHANE POLYACRYLATE AND POLYAMINE

(75) Inventors: Ling Tan, Raleigh; Bryan A. Naderhoff, Durham; Jeffrey H. Danneman, Raleigh, all of NC (US)

(73) Assignee: Reichhold, Inc., Research Triangle Park, NC (US)

( * ) Notice: Subject to any disclaimer, the term of this patent is extended or adjusted under 35 U.S.C. 154(b) by 0 days.

(21) Appl. No.: 09/248,890

(22) Filed: Feb. 11, 1999

(51) Int. Cl.[7] ............................ B05D 1/02; C08L 63/02; C08L 75/16

(52) U.S. Cl. ..................... 525/528; 427/386; 525/452; 525/454; 525/455

(58) Field of Search ....................... 525/528, 452, 525/454, 455; 427/386

(56) References Cited

U.S. PATENT DOCUMENTS

| | | | |
|---|---|---|---|
| 3,326,098 A | 6/1967 | Boettler | 94/22 |
| 3,897,378 A | 7/1975 | Scohy et al. | 474/297 |
| 3,904,795 A | 9/1975 | Mercurio | 427/375 |
| 3,914,463 A | 10/1975 | Mercurio et al. | 427/54 |
| 4,023,977 A | 5/1977 | Mercurio et al. | 106/178 |
| 4,051,195 A | 9/1977 | McWhorter | 260/837 R |
| 4,058,641 A | 11/1977 | Hnojewyj | 427/137 |
| 4,060,425 A | 11/1977 | Harada et al. | 106/90 |
| 4,076,671 A | 2/1978 | Bright | 260/28.5 |
| 4,088,633 A | 5/1978 | Gurney | 260/47 EN |
| 4,105,808 A | 8/1978 | McKenzie | 427/137 |
| 4,135,009 A | 1/1979 | Mercurio | 427/195 |
| 4,173,682 A | * 11/1979 | Noomen et al. | 522/93 |
| 4,185,132 A | 1/1980 | Gurney | 427/137 |
| 4,197,225 A | 4/1980 | Emmons et al. | 260/23 AR |
| 4,255,468 A | 3/1981 | Olson | 427/137 |
| 4,263,372 A | 4/1981 | Emmons et al. | 428/446 |
| 4,289,678 A | 9/1981 | Calder et al. | 260/33.6 UA |
| 4,303,565 A | 12/1981 | Tobias | 260/23 CP |
| 4,303,581 A | 12/1981 | Levine et al. | 260/18 PF |
| 4,330,444 A | 5/1982 | Pollman | 523/404 |
| 4,400,413 A | 8/1983 | Emmons et al. | 427/136 |
| 4,436,845 A | 3/1984 | Kitano | 523/172 |
| 4,460,625 A | 7/1984 | Emmons et al. | 427/136 |
| 4,522,961 A | 6/1985 | Martino et al. | 523/407 |

(List continued on next page.)

FOREIGN PATENT DOCUMENTS

| | | | |
|---|---|---|---|
| JP | 63-118388 | * | 5/1988 |
| JP | 4-149444 | * | 5/1992 |
| JP | 7-242798 | * | 9/1995 |

OTHER PUBLICATIONS

*Acrylate–Modified, Two–Part Epoxies for Coatings Applications*, Paint and Coatings Industry, Aug. 1996.

Wicks et al.; *Amine chemistries for isocyanate–based coatings*, Progress in Organic Coatings, 30 (1997) 265–270.

Lee et al.; *Aldimine–Isocyanate Chemistry: A Foundation for High Solids Coatings*, Waterborne, Higher–Solids, and Powder Coatings Symposium, Feb. 22–24, 1995, pp. 69–77.

Wicks et al.; *Control of the Reaction Between Polyaspartic Esters and Aliphatic Polyisocyanates*, Waterborne Higher –Solids, and Powder Coating Symposium, Feb. 24–26, 1993, pp. 49–56.

(List continued on next page.)

Primary Examiner—Robert E. L. Sellers
(74) Attorney, Agent, or Firm—Myers Bigel Sibley & Sajovec

(57) ABSTRACT

A composition suitable for forming a paint marking on a roadway comprises a polyfunctional urethane acrylate having at least two acrylate groups, an epoxy component and a polyfunctional amine. The polyfunctional urethane acrylate reacts with the polyfunctional amine to form an adduct with secondary amine groups. The secondary amine reacts with the epoxy component to yield a chemically crosslinked material having a no track time of less than about ten minutes.

17 Claims, 1 Drawing Sheet

U.S. PATENT DOCUMENTS

| | | | |
|---|---|---|---|
| 4,598,111 A | | 7/1986 | Wright et al. .................. 524/40 |
| 4,619,952 A | | 10/1986 | Hart et al. ................... 523/409 |
| 4,661,540 A | | 4/1987 | Le et al. ...................... 523/409 |
| 4,740,536 A | | 4/1988 | Chao .......................... 523/406 |
| 4,835,241 A | * | 5/1989 | Waddill ....................... 525/532 |
| 4,836,878 A | * | 6/1989 | Irving et al. ................. 523/176 |
| 4,886,845 A | | 12/1989 | Becker et al. ............... 523/403 |
| 4,897,434 A | | 1/1990 | Shimada et al. ............ 523/409 |
| 4,906,716 A | | 3/1990 | Yang et al. ............. 526/307.2 |
| 5,077,117 A | | 12/1991 | Harper et al. ............... 428/413 |
| 5,106,945 A | * | 4/1992 | Hare .......................... 525/332 |
| 5,126,170 A | | 6/1992 | Zwiener et al. .......... 427/385.5 |
| 5,151,454 A | * | 9/1992 | Goto et al. ................. 525/440 |
| 5,166,272 A | | 11/1992 | Burks et al. ................ 525/285 |
| 5,236,974 A | | 8/1993 | Dreischhoff et al. ........ 523/403 |
| 5,243,012 A | | 9/1993 | Wicks et al. ................... 528/58 |
| 5,264,468 A | | 11/1993 | Miyahara .................... 523/400 |
| RE34,766 E | | 10/1994 | Merz et al. .................. 156/326 |
| 5,385,684 A | | 1/1995 | Gutierrez et al. .......... 252/47.5 |
| 5,426,157 A | * | 6/1995 | Starner et al. .............. 528/369 |
| 5,442,034 A | | 8/1995 | Primeaux, II ................ 528/60 |
| 5,472,737 A | | 12/1995 | Anders ....................... 427/137 |
| 5,478,596 A | | 12/1995 | Gurney ....................... 427/137 |
| 5,480,955 A | | 1/1996 | Primeaux, II ................ 528/60 |
| 5,527,853 A | | 6/1996 | Landy et al. ................ 524/521 |
| 5,536,775 A | * | 7/1996 | Curatolo et al. ............. 525/530 |
| 5,554,671 A | | 9/1996 | Craun et al. ................. 523/408 |
| 5,605,953 A | | 2/1997 | Esser .......................... 524/522 |
| 5,609,965 A | | 3/1997 | Esser .......................... 428/522 |
| 5,616,677 A | | 4/1997 | Primeaux, II et al. ........ 528/66 |
| 5,665,793 A | | 9/1997 | Anders ....................... 523/172 |
| 5,677,379 A | * | 10/1997 | Becker et al. ............... 523/414 |
| 5,709,908 A | | 1/1998 | Gurney ....................... 427/137 |
| 5,770,674 A | | 6/1998 | Cageao et al. ................ 528/73 |
| 5,853,615 A | | 12/1998 | Suhr ..................... 252/301.21 |
| 5,874,491 A | | 2/1999 | Anders ....................... 523/457 |
| 5,939,514 A | | 8/1999 | Brown et al. ................ 528/229 |
| 5,962,148 A | * | 10/1999 | Nishimura et al. .......... 428/522 |
| 6,005,062 A | | 12/1999 | Hansen et al. ................. 528/68 |
| 6,015,871 A | | 1/2000 | Jamasbi et al. ................ 528/48 |
| 6,027,764 A | | 2/2000 | Gurney ....................... 427/137 |
| 6,057,415 A | | 5/2000 | Roesler et al. ................ 528/28 |
| 6,013,755 A | | 6/2000 | Primeaux, II et al. ........ 528/68 |
| 6,166,106 A | | 12/2000 | Purgett et al. ............... 523/172 |

OTHER PUBLICATIONS

Noomen, Arie; *Applications of Michael Addition Chemistry in Coatings Technology*, Progress in Organic Coatings, 32 (1997) 137–142.

Primeaux II, D. J., *100*

Solids Aliphatic Spray Polyurea Elastomer Systems, Polyurethanes World Congress 1991, Sep. 24–26, 1991, pp. 473–477.

Abstract (Wicks & Yeske), *Control of the Reaction Between Polyaspartic Esters and Aliphatic Polyisocyanates*, Feb. 24–26, 1993, pp. 49–56.

Brochure, Texaco Chemical Company, *Potential Uses for Polyurea Spray Elastomers*, 1990.

Brochure, Texaco Chemical Company, *Polyurea Spray Technology Information*, 1989, pp. 1–5.

Http://stnessy.cas.org/tmp/282588–0319287490–200/711682533.html, Abstract, Ochi et al., Jpn. Kokai Tokkyo Koho, 13 pp., Apr. 22, 2001.

Http://stnessy.cas.org/tmp/282588–0319287490–200/736074878.html, Abstract, Harper, Eur. Pat. Appl., 13 pp., Apr. 22, 2001.

* cited by examiner

US 6,437,059 B1

COMPOSITION OF EPOXY, URETHANE POLYACRYLATE AND POLYAMINE

FIELD OF THE INVENTION

The invention relates to polymeric compositions that may be used in paint applications.

BACKGROUND OF THE INVENTION

There has been recent activity surrounding the development of polymeric compositions that may be used, for example, in road- or pavement-marking applications. Due to the surface and ambient conditions under which the paint is subjected, it is desirable that the paint composition meet a number of requirements. These requirements include, for example, adhesion to road surfaces, resistance to chemical attack by water and/or salt, abrasion resistance, minimal hazard involving any processing solvents, ability to adhere to or hold or retain a glass bead filler or overcoating, long-term weather resistance, ability to be applied under a wide variety of ambient temperature and road surface conditions, flowability or sprayability, good wetting action with respect to roadway surfaces, and flexibility (i.e., the ability to move as road surfaces expand or contract).

A number of materials have been proposed for road surface paint compositions. For example, U.S. Pat. No. 4,185,132 to Gurney proposes the use of co-curative materials, namely a cycloaliphatic amine and an aliphatic amine, in combination with a liquid epoxide. The above mixture is applied to the paved surface, and the mixture cures in-situ. U.S. Pat. No. 4,105,808 to McKenzie proposes a paint composition for application at elevated temperatures on traffic roadways. The composition includes a paint vehicle having a nonvolatile organic film-forming binder and a volatile solvent in which the binder is dissolved. McKenzie alleges that the above mixture forms a non-tacky paint film when applied as a thin coating and exposed to ambient temperatures. U.S. Pat. 4,460,625 to Emmons et al. proposes coating and impregnating compositions for applications to concrete which include several monomers, a polyvalent metal salt or complex, and an organic peroxide. U.S. Pat. No. 4,051,195 to McWhorter proposes curable compostions formed from epoxide resin/polyacrylate ester or polymethacrylate ester compositions.

Notwithstanding the above developments, these compositions often cure in a relatively slow time period. As an example, the tack free time is typically more than 60 minutes during which time the road must be blocked to apply the paint. The lengthy delay is particularly troublesome in view of the increasing traffic volume in high growth regions. Moreover, the durability of this paint is believed to be limited. Thus, there is a need in the art for a paint compositions which are faster curing and exhibit greater durability.

SUMMARY OF THE INVENTION

The present invention addresses the shortcomings alluded to above, and provides a polymeric composition for use in traffic paint exhibiting a fast cure rate as defined in greater detail hereinbelow. The composition comprises a polyfunctional urethane acrylate component, an epoxy component, and a polyfunctional amine component. Advantageously, the polyfunctional urethane acrylate component reacts with the polyfunctional amine component to form a secondary amine component. The formation of the secondary amine proceeds relatively quickly. The secondary amine then reacts with the epoxy component such that a chemically crosslinked or thermoset polymeric material is formed. The composition exhibits improved properties over conventional compositions, particularly two component epoxy system, in that the composition of the invention displays improved cure speed and improved durability.

The polymeric composition may be employed in a traffic paint composition. The traffic paint composition comprises the polymeric composition and a pigment.

DETAILED DESCRIPTION OF THE PREFERRED EMBODIMENTS

Figure 1:
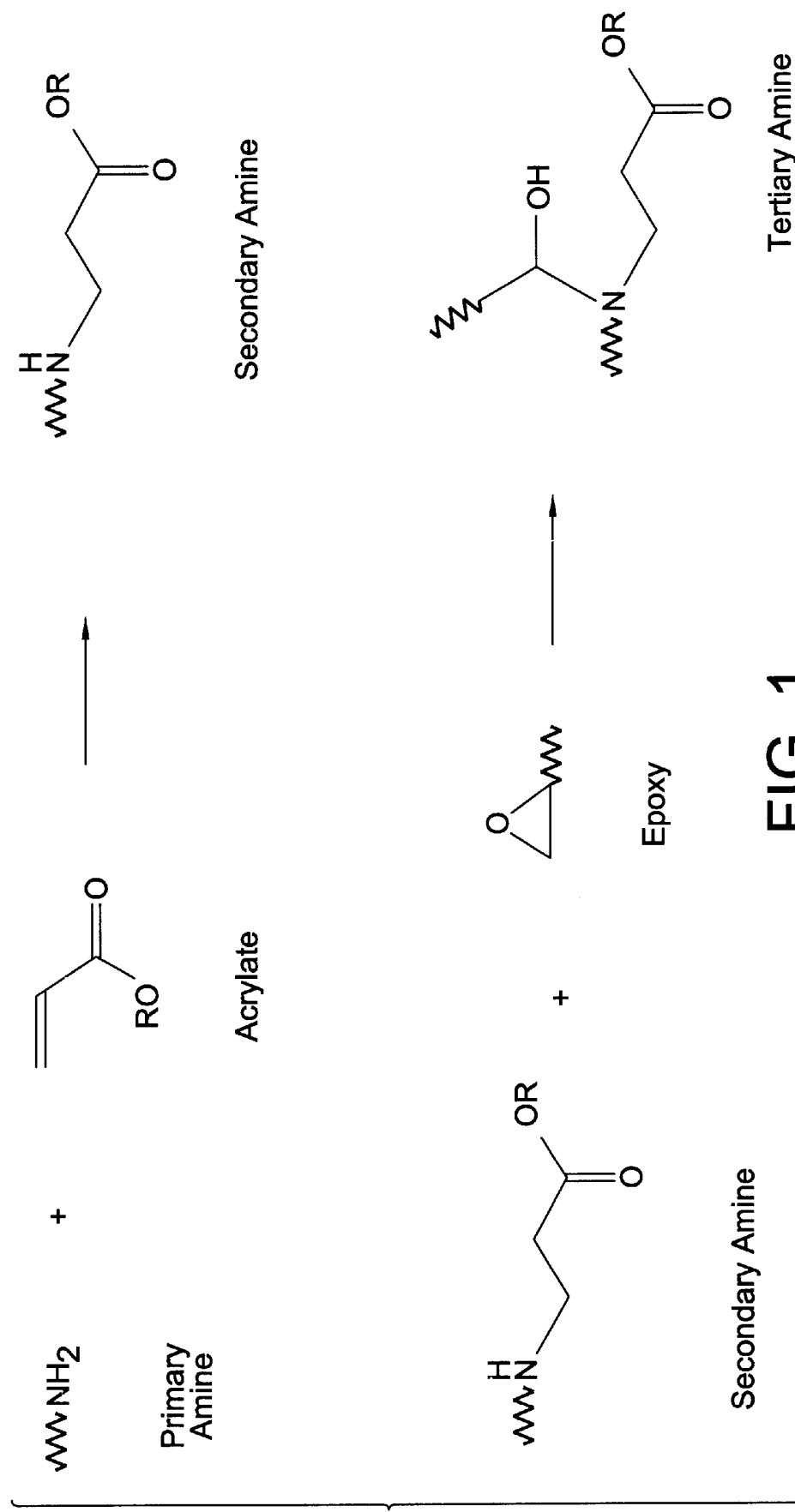
FIG. 1 illustrates a reaction scheme in accordance with the method of the invention.

The invention will now be described in greater detail with reference to the preferred embodiments which follow. It should be appreciated, however, that these embodiments are for illustrative purposes only, and are not meant to limit the invention as defined by the claims.

As alluded to hereinabove, the invention refers to a polymeric composition that exhibits a fast cure rate. For the purposes of the invention, the term "fast cure rate" may be defined according to various measuring methods. In one instance, a fast cure rate may be defined by the term "no track time" which refers to the time necessary for the composition to cure on a road or other surface to the extent that no wheel tracks are left after the composition has been contacted by a vehicle. A preferred "no track time" is less than about 10 minutes, more preferably less than about five minutes, and most preferably less than or equal to about 2 minutes. In another instance, the term "through cure" refers to the time necessary for the composition (e.g., film) to develop hardness or integrity from a surface to a substrate. A preferred "through cure" time is less than about 10 minutes, and more preferably about 8 minutes. In yet another instance, the term "tack free time" refers to the time necessary for a composition in the form of a film to develop a hard surface. Preferably, the "tack free time" is less than about 20 minutes and is more preferably about 9 minutes.

The polyfunctional urethane acrylate component which is used in the polymeric composition of the invention may be selected from those materials which are known in the art. Typically, the polyfunctional urethane acrylate component is a reaction product of a hydroxyl functional acrylate and an aliphatic isocyanate. Examples of hydroxyl functional acrylates include, but are not limited to, hydroxy ethyl acrylate, hydroxy propyl acrylate, pentaerythritol triacrylate, ethoxylated pentaerythritol triacrylate, and propoxylated pentaerythritol triacrylate. A particularly preferred hydroxy functional acrylate is pentaerythritol triacrylate. Mixtures of the above may be employed.

Examples of aliphatic isocyanates that may be employed include, but are not limited to, isophorone diisocyanate, 1,1'-methylenebis(4-isocyantocyclohexane), hexamethyene diisocyanate, trimethyl-hexamethylene diisocyanate, biuret of isophorone diisocyanate, isocyanurate trimer of isophorone diisocyanate, biuret of hexamethylene diisocyanate, isocyanurate trimer of hexamethylene diisocycanate, prepolymers based on isophorone diisocyante and trimethylol propane, prepolymers of isophorone diisocyanate and pentaerythritol, and prepolymers of isophorone diisocyanate and hexane diol. Mixtures of the above may be employed. In general, the aliphatic isocyanate can either be a monomeric component or may be a material that is chain extended by a polyhydric alcohol that may include, but is not limited to, diols, triols, and tetraols that are known to one skilled in the art. Examples of alcohols include, but are not limited to, ethylene glycol, diethylene glycol, trimethylol propane, trimethylol ethane, pentaerythritol, ethoxylated pentaerythritol, and propoxylated pentaerythritol. The polyol may be in the form of a polyester polyol or a polyether polyol such as, but not limited to, polypropylene glycol or polyethylene glycol or a combination of both.

Particularly preferred aliphatic isocyanates are isophorone diisocyanate and prepolymers of isophorone diisocyanate and trimethylol propane and pentaerythritol. Mixtures of any of the above may be employed.

The polyfunctional urethane acrylate used in the invention preferably contains two or more acrylate functionalities, and more preferably four or more acrylate functionalitites.

The polymeric composition preferably comprises from about 5 to about 60 parts per weight of the polyfunctional urethane acrylate component, and more preferably more from about 10 to about 50 parts by weight of this component. These percentages are based on the weight of the reactive components.

The epoxy component that is employed in the invention may be selected from a number of epoxy compounds that are known in the art.

For the purposes of the invention, the epoxy component may be selected from an epoxide resin, an epoxy diluent, an epoxy flexibilizer, and mixtures thereof. Preferably, the epoxy component has from about 1 to about 3 1,2-epoxy groups per molecule, and more preferably, from about 2 to about 2.5 1,2-epoxy groups per molecule.

For the purposes of the invention, an "epoxide resin" may be defined as an oligomer or polymer which contains epoxide functionality. The epoxide resin is preferably a glycidyl ether of a polyhydric phenol and polyhydric alcohol having an epoxide equivalent weight of from about 100 to about 500. Exemplary epoxide resins are the ones based on bisphenol-A and bisphenol-F, such as, but not limited to, the diglycidyl ether of bisphenol-A and the diglycidyl ether of bisphenol-F. Other epoxy resins include, but are not limited to, the diglycidyl ether of tetrabromobisphenol A, epoxy novolacs based on phenol-formaldehyde condensates, epoxy novolacs based on phenol-cresol condensates, epoxy novolacs based on phenol-dicyclopentadiene condensates, diglycidyl ether of hydrogenated bisphenol A, digylcidyl ether of resorcinol, tetraglycidyl ether of sorbitol, and tetra glycidyl ether of methylene dianiline. Mixtures of any of the above may be employed.

An "epoxy diluent" may be defined as an epoxy-containing monomeric component which is capable of reducing the viscosity of a composition. Examples of epoxy diluents include, but are not limited to, glycidyl ethers of the following alcohols: 2-ethylhexanol, $C_8$–$C_{10}$ alcohol, $C_{12}$–$C_{14}$ alcohol, cresol, p-tertiary butyl phenol, nonyl phenol, phenol, neopentyl glycol, 1,4-butanediol, cyclohexane dimethanol. propylene glycol, dibromo neopentyl glycol, timethylol propane, trimethylol ethane, and n-butanol. Other diluents which do not contain epoxy functionality may be employed and include, for example, benzyl alcohol, and nonyl phenol. Diluents with acrylate functionality can be employed and include tripropylene glycol diacrylate, hexane diol diacrylate, and trimethylol propane triacrylate.

Diluents with carbonate functionality may also be used and include ethylene and propylene carbonate. Preferably, the epoxy diluent has 1 1,2-epoxy group per molecule. Mixtures of any of the above can be used.

An "epoxy flexibilizer" may be defined as a component that can be added to an epoxy system to improve the toughness, flexibility, or impact resistance of a resulting resin. Examples include, but are not limited to, rubber-modified bisphenol A epoxies, epoxidized castor oil based epoxies, and epoxies which are modified with dimerized fatty acids. Mixtures of any of these may be used.

The polymeric composition may comprise various amounts of the epoxy component. Preferably, the composition comprises from about 10 to about 70 weight percent of the epoxy component, and more preferably from about 20 to about 50 weight percent. These amounts are based on the total weight of reactive components.

As set forth herein, the polymeric composition of the invention comprises a polyfunctional amine component. The polyfunctional amine preferably is an aliphatic amine. The polyfunctional amine preferably has at least two amine groups per molecule. Exemplary polyfunctional amines include, but are not limited to, diethylene triamine, ethylene diamine, triethylene tetramine, tetraethylene pentamine, hexamethylene diamine, 1,2-diaminocyclohexane, amino ethyl piperazine, and the like. Mixtures of any of the above may be employed. Preferably, the polyfunctional amine is used in the polymeric composition an amount from about 10 to about 60 weight percent, and more preferably from about 20 to about 40 weight percent. These weight percentages are based on the total weight of reactive components.

In accordance with the invention, the polyfunctional amine may be used in the form of an adducted amine. The adducted amine may be prepared in accordance with procedures that are known in the art. Typically, the amine adduct is formed by reacting an excess of polyfunctional amine with an epoxy resin. An example of an amine adduct is set forth in U.S. Pat. Nos. 4,185,132 and 4,088,633 to Gurney; and U.S. Pat. No. 5,385,684 to Gutierrez et al, the disclosures of which are incorporated herein by reference in their entirety. In numerous instances, it may be preferable to employ the amine adducts. For example, the amine adducts may display a lower volatility relative to the unmodified polyfunctional amines thereby making them potentially safer to handle. Adduction may also be used to increase the amine hydrogen equivalent weight of the polyfunctional amine so that a practical mixing ratio of the components is possible, for example 2 parts of a component A (i.e., a polyfunctional urethane acrylate and an epoxy component) to 1 part of a component B (i.e., a polyfunctional amine) by volume. Moreover, adduction may improve the compatibility of the polyfunctional amine with the polyfunctional urethane acrylate and epoxy component that potentially results in films with improved appearance.

The composition of the invention may also encompass other components that are conventionally employed in polymerizable systems. These components include, but are not limited to, accelerators, promoters, and the like. Examples of accelerators that may be used in the composition include, for example, nonyl phenol, t-butyl phenol, bisphenol A, benzyl alcohol, salicyclic acid, lactic acid, p-toluene sulfonic acid, and the like, along with mixtures of the above.

The polymeric composition of the invention is typically utilized in conjunction with a paint composition, although other uses are contemplated within the scope of the invention. The paint composition may employ those components, additives, and the like which are known to the skilled artisan. Examples of materials that are typically employed in traffic paint compositions are set forth in U.S. Pat. No. 4,105,808 to McKenzie, the disclosure of which is incorporated herein by reference in its entirety. In particular, the paint composition comprises pigments such that the paint is visible after being applied to the pavement. Typically, while or yellow pigment is employed in the composition, preferably in an amount ranging from about 15 to about 25 parts based on the weight of the composition.

In another aspect, the invention relates to a method of forming a paint marking on a roadway. The method comprises applying a traffic paint composition comprising the polymeric composition as defined herein to the surface of a roadway. The method is advantageous in that it may be used utilizing existing equipment under ambient conditions.

A preferred method for carrying out the invention is as follows. Preferably, the composition of the invention is present as a two-component composition in which the polyfunctional urethane acrylate and epoxy component is part of Component A and the polyfunctional amine is part of Component B. Components A and B are applied, typically sprayed, to a substrate by employing conventional application equipment such as, for example, a plural component sprayer. Typically, Components A and B are mixed immediately prior to being applied. Subsequent to application to the substrate, the mixed composition of Components A and B rapidly cures generally according to the reaction scheme set forth in FIG. 1.

The foregoing examples are presented to illustrate the invention and are not intended to limit the scope of the invention as defined by the claims. All amounts listed in the examples are by weight, unless otherwise specified. The following list of resin components will be referred to in the examples:

Resin A is diglycidyl ether of bisphenol A which is commercially available from Reichhold Inc. of Research Triangle Park, N.C. as EPOTUF® 37–140. Resin A has an average molecular weight of 370 and an average epoxy equivalent weight of 187.

Resin B is a hexafunctional urethane acrylate resin based on pentaerythritol triacrylate and isophorone diisocyanate. Resin B is commercially available from UCB Radcure of Smyrna, Ga. as Ebecryl® 1290.

Resin C is a low molecular weight xylene formaldehyde resin, which is commercially available as Nikanol® Y-50 from Mitsubishi Gas & Chemical of New York, N.Y.

Resin D is an epoxy flexibilizer based on a castor oil modified epoxy resin. The resin is commercially available from Reichhold Inc. of Research Triangle Park, N.C. as EPOTUF® 37–151. Resin D has an average epoxy equivalent weight of 500.

Resin E is an epoxy diluent, which is the glycidyl ether of C12–C14 alcohol. Resin E is commercially available from Reichhold Inc. of Research Triangle Park, N.C. as EPOTUF® 37-058.

Resin F is a acrylate oligomer which is trimethol propane triacrylate and is commercially available from UCB Radcure of Smyrna, Ga. as TMPTA.

Resin G is a solid bisphenol A based epoxy resin with molecular weight of 1100 and epoxy equivalent weight of 530. Resin G is commercially available from Reichhold Inc. of Research Triangle Park, N.C. as EPOTUF® 37-001.

Pigment A is titanium dioxide pigment, which is commercially available from Dupont of Wilmington, Del. as Ti-Pure® 902.

EXAMPLE 1

A pigment base was prepared by high-speed dispersing 62.5 parts of Pigment A in 37.5 parts of Resin A for 30 minutes until a Hegman Grind of 7 was obtained. Next 25 parts of Resin A was added to the pigment and thoroughly mixed.

EXAMPLE 2

Component A of a fast curing traffic paint was prepared by blending 40 parts of pigment base from Example 1, 30 parts of Resin B, 10 parts of Resin D, 8 parts of Resin E, and 2 parts of Resin G. The cure speed and durability properties of the cured films based on Example 2 are set forth in Table 1.

EXAMPLE 3

Component A of a fast curing traffic paint was prepared by blending 40 parts of pigment base from Example 1, 37 parts of Resin B, 8 parts of Resin D, and 15 parts of Resin E. The cure speed and durability properties of the cured films based on Example 3 are set forth in Table 1.

EXAMPLE 4

A polyfunctional amine adduct was prepared according to the following procedure. Into a 1 liter reaction flask equipped with stirring, temperature control, and nitrogen inert gas was charged 197.9 grams of a 85% solution of hexamethylene diamine in water and 9.1 grams of 1,2 diaminocyclohexane. The contents were heated to 140–145° C. and approximately 30 grams of water were removed by atmospheric distillation. The flask was cooled to 90° C. and 183.4 grams of Resin G was added over approximately 10 minutes. The temperature was held at 85–90° C. for 1 hour and then 110.6 grams of Resin C, 190.3 grams of nonyl phenol, and 38.4 grams of diethylene triamine were added to the flask and mixed. The final composition had a calculated amine hydrogen equivalent weight of 85 and a viscosity of 41 stokes at 25° C.

EXAMPLE 5

A polyfunctional amine was prepared by blending 60 parts of hexamethylene diamine and 40 parts of nonyl phenol. This polyamine composition had a calculated amine hydrogen equivalent weight of 48.

EXAMPLE 6

A polyfunctional urethane acrylate was prepared according to the following procedure. Into a 2 liter flask equipped with stirring, temperature control, and nitrogen inert gas was charged 277 grams of isophorone diisocyanate and 2.9 grams of monomethyl ether of hydroquinone. The reaction was heated to 65° C. and 11 grams of trimethylolpropane was charged. The reaction was heated to 70° C. and held for 1 hour, at which time the % isocyanate was measured at 31.3%. Next 1285.5 grams of pentaerythritol triacrylate available from was charged. A gas sparge was initiated which was comprised of 2:1 by volume mix of nitrogen and air.

After a 30 minute hold at 70° C., 0.79 grams of dibutyl tin dilaurate catalyst was charged and the reaction was held at 75° C. for 3 hours, at which time the % isocyanate was measured at 0.2%. The final resin had a viscosity of 13,700 cps at 25° C. and a calculated acrylate equivalent weight of 122.

EXAMPLE 7

Component A of fast curing traffic paint was prepared by blending 40 parts of pigment base from Example 1, 30 parts of the urethane acrylate from Example 6, 10 parts of Resin D, 8 parts of Resin E, and 2 parts of Resin G. The cure speed and durability properties of the cured films based on Example 7 are set forth in Table 1.

EXAMPLE 8

Component A of standard epoxy traffic paint was prepared by blending 40 parts of pigment base from Example 1, 40 parts of Resin A, and 20 parts of Resin F. The comparative cure speed and durability properties of the cured films based on Example 8 are set forth in Table 1.

EXAMPLE 9

A plural component road-striping machine applied the paint compositions described in examples 2 and 4. The two components were heated to 120–130° F. and spray applied to a road surface using a 2:1 mix ratio and a top dressing of retroreflective glass beads. A no track time test was run by driving an automobile over the stripe after the stripe was applied. The stripe passed the no track test after 2 minutes curing time. A standard epoxy stripe took required approximately 6 minutes of curing time to pass the no track test.

TABLE 1

| Samples | Epoxy Control | Urethane Acrylate | Urethane Acrylate | Urethane Acrylate |
|---|---|---|---|---|
| Part A | Example 8 | Example 2 | Example 3 | Example 7 |
| Part B | Example 4 | Example 4 | Example 5 | Example 4 |
| Mix Ratio, by volume | 2A to 1B | 2A to 1B | 3A to 1B | 2A to 1B |
| Cure Speed, minutes | | | | |
| Gel time | 19 | 2 | 50 sec. | 1 |
| No track time, without glass beads | 29 | 5 | 2 | 5 |
| Through dry time | 60 | 8 | 2 | 7 |
| Tack free time | 60 | 12 | 9 | 9 |
| Taber Abrasion, Mg lost after 1000 cycles | 88 | 71 | 70 | 68 |
| Flexibility | Fail 1" | ½" | ½" | ½" |
| Accelerated Weathering | | | | |
| QUV initial Yellowness Index | 4 | 3 | 4 | 4 |
| Initial Gloss 60* | 22 | 93 | 82 | 66 |
| 500 hr QUV Yellowness Index | 43 | 17 | 10 | 18 |
| 500 hr Gloss 60* | 7 | 42 | 86 | 45 |

Disclosed herein are typical preferred embodiments of the invention and, although specific terms are employed, they are used in a generic and descriptive sense only and not for purposes of limitation of the scope of the invention as defined by the claims.

That which is claimed:

1. A polymeric composition exhibiting a fast cure rate, said composition consisting essentially of:
   a polyfunctional urethane acrylate component having more than four acrylate functionalities per molecule;
   an epoxy component; and
   from about 20 to about 40 percent by weight of a polyfunctional amine component;
   wherein said polyfunctional urethane acrylate component and said polyfunctional amine component have sufficient functionalities such that said polyfunctional urethane acrylate component reacts with said polyfunctional amine component to form a secondary amine component, and wherein said secondary amine reacts with said epoxy component such that a chemically crosslinked polymeric material is formed, and wherein said polymeric composition has a no track time of less than about 10 minutes.

2. The composition according to claim 1, wherein the polyfunctional urethane acrylate component is a reaction product of a hydroxyl functional acrylate and an aliphatic isocyanate.

3. The composition according to claim 2, wherein the hydroxy functional acrylate is selected from the group consisting of pentaerythritol triacrylate, ethoxylated pentaerythritol triacrylate, propoxylated pentaerythritol triacrylate, and mixtures thereof.

4. The composition according to claim 2, wherein the hydroxy functional acrylate is pentaerythritol triacrylate.

5. The composition according to claim 1, wherein the aliphatic polyamine contains at least two amine groups per molecule.

6. The composition according to claim 1, wherein the aliphatic polyamine is selected from the group consisting of diethylene triamine, ethylene diamine, hexamethylene diamine, triethylene tetramine, tetraethylene pentamine, aminoethylpiperazine, and mixtures thereof.

7. The composition according to claim 1, wherein the epoxy component is selected from an epoxide resin, an epoxy diluent, an epoxy flexiblizer, and mixtures thereof.

8. The composition according to claim 1, wherein the epoxy component contains more than one 1,2-epoxy groups per molecule.

9. The composition according to claim 1, wherein said composition comprises an accelerator.

10. A traffic paint composition comprising the polymeric composition defined in claim 1 and at least one pigment.

11. The composition according to claim 10, wherein the polyfunctional urethane acrylate component is a reaction product of a hydroxy functional acrylate and an aliphatic isocyanate.

12. The composition according to claim 11, wherein the hydroxy functional acrylate is selected from the group consisting of pentaerythritol triacrylate, ethoxylated pentaerythritol triacrylate, propoxylated pentaerythritol triacrylate, and mixtures thereof.

13. The composition according to claim 12, wherein the hydroxy functional acrylate is pentaerythritol triacrylate.

14. The polymeric composition according to claim 1, wherein the epoxy component is selected from the group consisting of resins based on diglycidyl ether of bisphenol-A, resins based on diglycidyl ether of bisphenol-F, diglycidyl ether of tetrabromobisphenol A, epoxy novolacs based on phenol-formaldehyde condensates, epoxy novolacs based on phenol-cresol condensates, epoxy novolacs based on phenol-dicyclopentadiene condensates, diglycidyl ether of hydrogenated bisphenol A, digylcidyl ether of resorcinol, tetraglycidyl ether of sorbitol, tetra glycidyl ether of methylene dianiline, and mixtures thereof.

15. The polymeric composition according to claim 1, wherein the epoxy diluent is selected from the group consisting of glycidyl ethers of 2-ethylhexanol, glycidyl ethers of $C_8$–$C_{10}$ alcohol, glycidyl ethers of $C_{12}$–$C_{14}$ alcohol, glycidyl ethers of cresol, glycidyl ethers of p-tertiary butyl phenol, glycidyl ethers of nonyl phenol, glycidyl ethers of phenol, glycidyl ethers of neopentyl glycol, glycidyl ethers of 1,4-butanediol, glycidyl ethers of cyclohexane dimethanol, glycidyl ethers of propylene glycol, glycidyl ethers of dibromo neopentyl glycol, glycidyl ethers of timethylol propane, glycidyl ethers of trimethylol ethane, glycidyl ethers of n-butanol, and mixtures thereof.

16. The polymeric composition according to claim 1, wherein the epoxy flexibilizer is selected from the group consisting of rubber-modified bisphenol A epoxies, epoxidized castor oil based epoxies, epoxies which are modified with dimerized fatty acids, and mixtures thereof.

17. A polymeric composition exhibiting a fast cure rate, said composition consisting essentially of:

a hexafunctional urethane acrylate component formed from pentaerythritol triacrylate;

an epoxy component; and from about 20 to about 40 percent by weight of a polyfunctional amine component;

wherein said hexafunctional urethane acrylate component and said polyfunctional amine component have sufficient functionalities such that said hexafunctional urethane acrylate component reacts with said polyfunctional amine component to form a secondary amine component, and wherein said secondary amine reacts with said epoxy component such that a chemically crosslinked polymeric material is formed, and wherein said polymeric composition has a no track time of less than about 10 minutes.

* * * * *